No. 643,934. Patented Feb. 20, 1900.
E. H. BENNERS.
BEARING FOR JOURNALS.
(Application filed Oct. 10, 1899.)

(No Model.)

Witnesses
Charles Hanimann
C. F. Carrington

Inventor
Edwin H. Benners
By his Attorney
Chas. L. Earll.

THE NORRIS PETERS CO., PHOTO-LITHO., WASHINGTON, D. C.

UNITED STATES PATENT OFFICE.

EDWIN H. BENNERS, OF ELIZABETH, NEW JERSEY.

BEARING FOR JOURNALS.

SPECIFICATION forming part of Letters Patent No. 643,934, dated February 20, 1900.

Application filed October 18, 1899. Serial No. 733,965. (No model.)

*To all whom it may concern:*

Be it known that I, EDWIN H. BENNERS, a citizen of the United States of America, and a resident of the city of Elizabeth, county of Union, and State of New Jersey, have invented certain new and useful Improvements in Bearings for Journals, of which the following is a specification.

My invention relates to bearings for journals, and it is especially designed for use in connection with car-journals.

The object of my invention is to produce a bearing that shall be simple and effective and at the same time one which is easily installed and removed and which is cheap to manufacture, and especially one in which the amount of metal wasted when it becomes necessary to replace the worn parts with new ones shall be reduced to a minimum.

The object is further to provide means whereby the pressure upon the wearing-surface of the bearing is more uniformly distributed than is the case with those at present in use.

My invention consists in forming a yoke, preferably of steel, which is adapted to be held in position above the car-journal in the journal-box and in inserting between the said yoke and the journal suitable bearing-pieces made, preferably, of brass or other composition metal suitable for the purpose, said bearing-pieces being in pivoted connection with said yoke.

Figure 1:
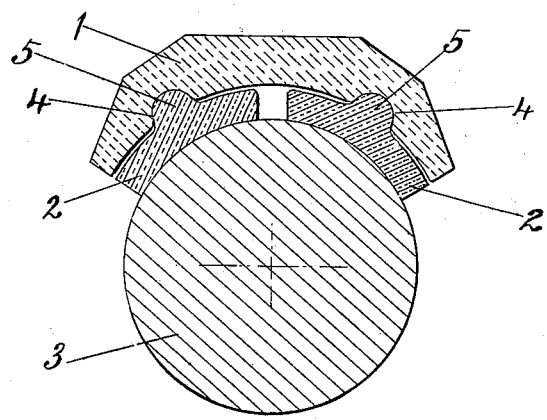
Figure 2:
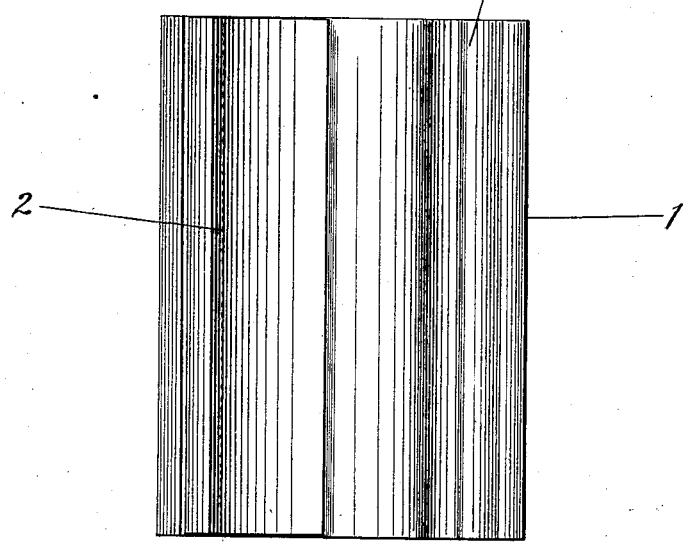

In the drawings accompanying and forming part of this specification, Figure 1 is a cross-section through one form of my journal-bearing, showing the journal in place. Fig. 2 is a bottom view of the bearing, showing one of the bearing-pieces removed.

Numeral 1 represents the yoke.

2 2 represent the bearing-pieces, and 3 represents a journal.

4 4 represent recesses in the yoke 1, and 5 5 represent projections on the bearing-pieces, which engage the recesses 4 4, which projections are placed about midway of the arc covered by the bearing-piece.

It will be seen that by means of my arrangement I am able to get a uniform pressure over the face of the bearing-piece, that by virtue of the slight rocking movement which the bearing-pieces have they will adjust themselves to compensate for any slight irregularity there may be in the bearing-piece when it is first installed, and also that as the bearing-pieces wear they will tend, by virtue of the uniform pressure over the whole surface, to wear evenly, and thus enable a greater amount of wear to be obtained before they become unfit for use.

Having thus described my invention, what I claim is—

1. In a bearing for journals a yoke having longitudinal cylindrical grooves, in combination with bearing-pieces incapable of contact with each other having on one side concave cylindrical faces to fit the journal and on the other side longitudinal cylindrical projections to engage the grooves in said yoke.

2. In a bearing for journals the combination with bearing-pieces, each having a concave cylindrical surface on one side adapted to fit and bear upon the journal and a projection on its other side, of a yoke provided with recesses for receiving the projections on said bearing-pieces.

Signed by me at New York, N. Y., this 17th day of October, 1899.

EDWIN H. BENNERS.

Witnesses:
    G. D. W. SMITH,
    GEORGE THOMS.